Patented May 27, 1930

1,760,539

UNITED STATES PATENT OFFICE

SYLVESTER BOYER, OF LYNN, MASSACHUSETTS, ASSIGNOR TO GENERAL ELECTRIC COMPANY, A CORPORATION OF NEW YORK

OIL TREATMENT

No Drawing.    Application filed February 2, 1925.   Serial No. 6,462.

The present invention relates to the removal of moisture from oil, which is present in solution and in suspension and some of the minute impurities, such as acid impurities.

It is the main object of my invention to effectively dry and remove minor impurities from mineral oil intended for electrical insulating purpose, for example, for use in condensers and transformers so as to improve its dielectric and insulating properties.

In accordance with my invention the oil to be used for electrical insulating purposes is treated with dry finely powdered intermediate cellulose oxidation products which herein are termed oxycellulose.

In carrying out my invention the oxycellulose in finely powdered form is thoroughly agitated in the warm oil and then separated by filtration through dry filter paper or the oil may be carefully decanted after the finely powdered oxidized cellulose has settled to the bottom. Filtration is preferable since it insures the complete removal of the microscopic solid particles. Also in carrying out my invention, the intermediate cellulose oxidation product may be imbedded in a filter medium, such as paper, and the warm oil passed through it a number of times until the dielectric properties have reached the maximum.

The cellulose oxidation products are prepared as follows: Cotton or any form of pure cellulose is heated with concentrated nitric acid slowly to 70° C. thoroughly agitating.

After the reaction with the cellulose begins, visibly the temperature is slowly raised to 100° C. until the reaction is considered complete or until the fibres of the cotton have disintegrated and have lost their fibrous structure. Cold water is added to the acid mixture. After the oxycellulose have settled out, the acid is removed by decantation. This process of removing the acid is continued until acid can scarcely be detected with well known indicators. Any well known methods for removing finely divided solids from liquids may be employed satisfactorily. The product thus obtained has a reducing value toward Fehling's solution of from 12 to 15 according to the method of test reported in any book on quantitative analysis.

The oxycellulose when roughly dried solidifies into a hard mass which is finely powdered and redried in vacuo. It is then ready for use. Oxycellulose acts on Fehling solution in a manner similar to glucose. It has a copper number varying from 5 to 16 or higher.

I have found that oil heated to 90–100° C. and the oxycellulose slowly react with each other if allowed to remain in contact over a week or more, but for short periods of time in hot oil free from dissolved air there is no reaction, nor is there a reaction over long periods of time at ordinary temperature in the absence of air.

Samples of paper and oil impregnated with powdered oxycellulose have been tested in oil at a stress of about three times the rated voltage for long periods of time without electrical failure showing that there is no deterioration under electrical stress with the oxidized cellulose powder in the oil.

In accordance with one way of carrying out my invention, the dried oxycellulose is stirred in the oil in the proportion of 2 or 3 parts of the powder to 1000 parts of the oil, and with occasional agitation is allowed to remain in contact for several days. The proportion of oil to powder can be varied depending upon the original properties of the oil being treated and the time of treatment can be shortened if constantly agitated. The oil is then filtered using vacuum dried filter paper to remove all the oxidized cellulose.

Upon testing the oil, it will be found that the rupture voltage has been greatly increased. I have secured break-down voltages on #10 "Transil oil" thus treated of 42,000–45,000 volts per $\frac{1}{10}''$ gap using 1" disk electrodes. Other methods of treating such oil gave results varying from 32,000–35,000 volts. Oil thus treated, therefore, is of particular utility in electrostatic condensers in which the insulation consists of paper or other materials impregnated with oil. The removal of acidic impurities improves the power factor of mineral oil.

What I claim as new and desire to secure by Letters Patent of the United States, is:—

The method of treating mineral oil which consists in bringing such oil into contact with oxycellulose resulting from nitric acid oxidation for a length of time sufficient to remove water and acid bodies from the oil.

In witness whereof, I have hereunto set my hand this 30th day of January, 1925.

SYLVESTER BOYER.